Jan. 18, 1927.
T. A. CONLON
VEHICLE MOUNT FOR GUNS
Filed Nov. 9, 1925
1,614,655
2 Sheets-Sheet 1
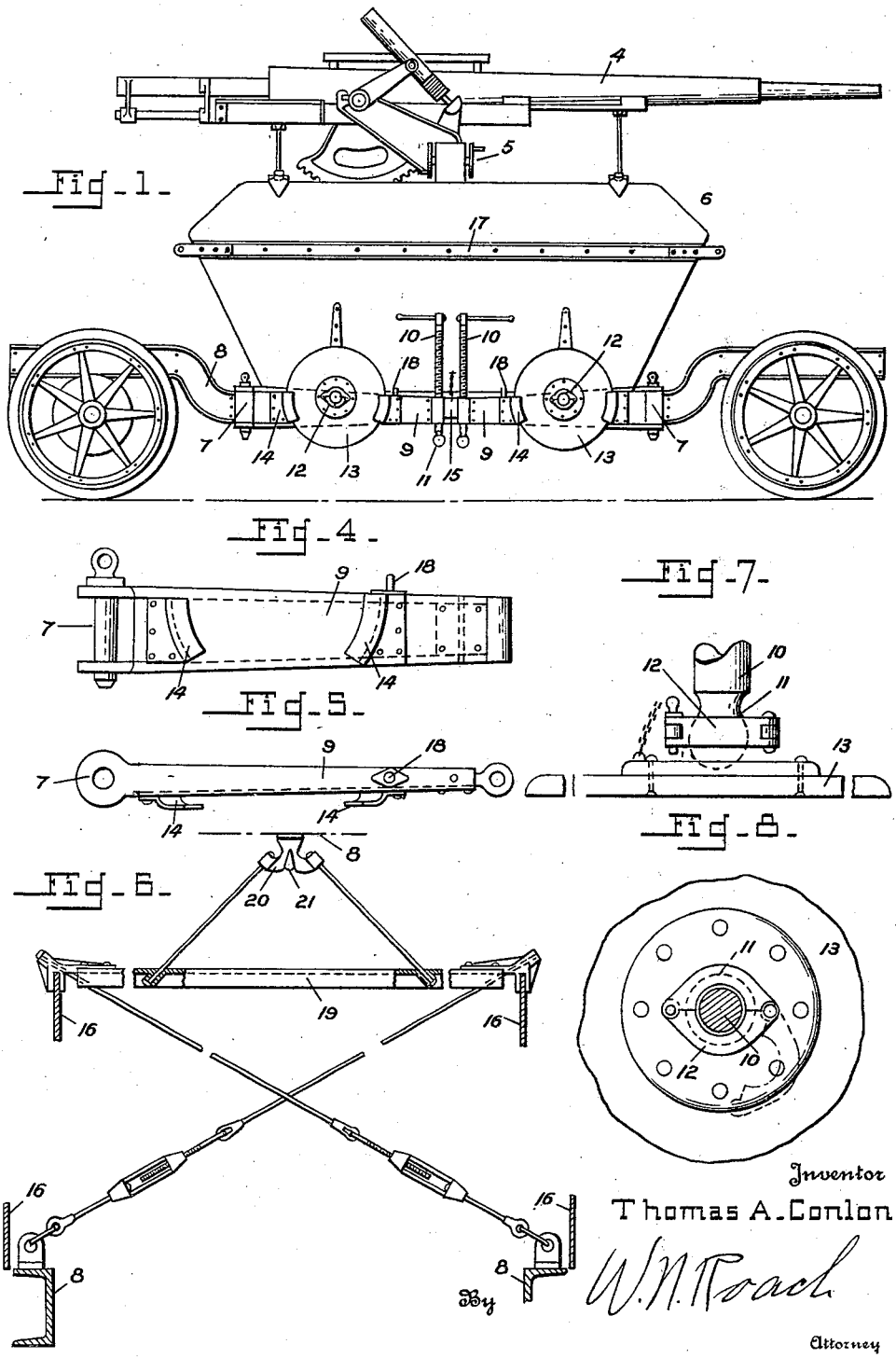
Inventor
Thomas A. Conlon
By W.N. Roach
Attorney Jan. 18, 1927.　　　　　T. A. CONLON　　　　　1,614,655
VEHICLE MOUNT FOR GUNS
Filed Nov. 9, 1925　　　　2 Sheets-Sheet 2
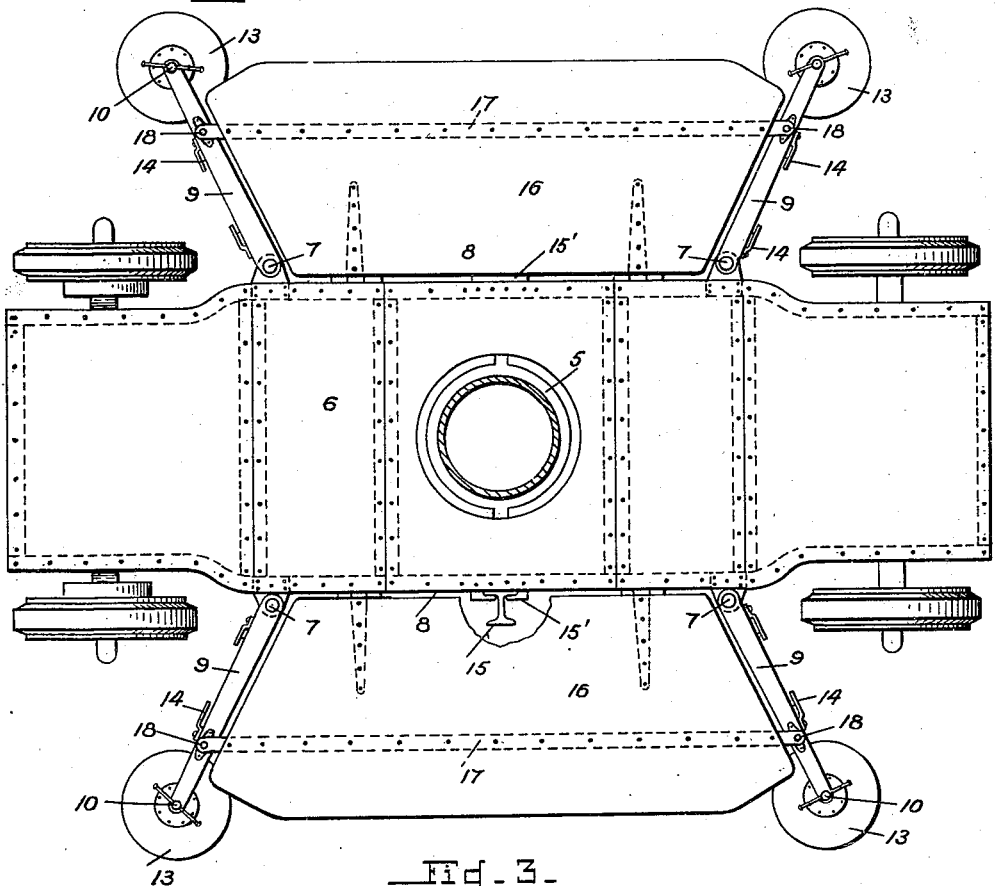
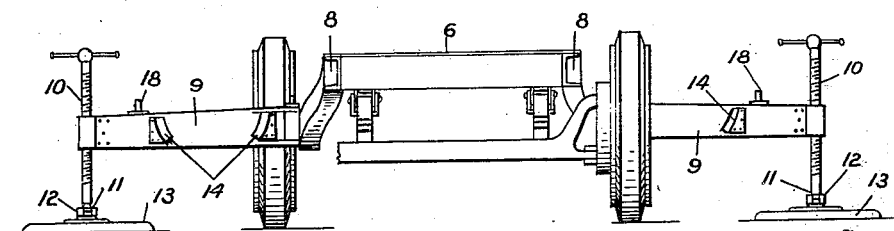
Inventor
Thomas A. Conlon
By W. M. Roach
Attorney Patented Jan. 18, 1927.

1,614,655

UNITED STATES PATENT OFFICE.

THOMAS A. CONLON, OF SILVER SPRING, MARYLAND.

VEHICLE MOUNT FOR GUNS.

Application filed November 9, 1925. Serial No. 67,973.

(GRANTED UNDER THE ACT OF MARCH 3, 1883; 22 STAT. L. 625.)

The invention described herein may be used by the Government, or any of its officers or employees in prosecution of work for the Government, or by any other person in the United States, without payment to me of any royalty thereon, in accordance with the act of March 3, 1883.

This invention relates to vehicle mounts for guns.

In mounting guns of the anti-aircraft type where mobility must be combined with rapidity of action, it has been customary to mount the gun on an auto truck or trailer. However, in order to secure stability and to relieve the vehicle of the road stresses it is necessary to convert the vehicle into a fixed mount by raising it from its springs. To this end screw jacks have been passed through the vehicle frame to raise the vehicle and stability is obtained by employing outriggers.

The primary object of the present invention is to provide a combined supporting and stabilizing means in which the screw jacks are carried by the outriggers so as to enlarge the base of the fixed mount and thereby obtain greater stability. In the traveling position, the outriggers are swung in against the frame, their adjacent ends being spaced sufficiently to permit reception of a short section of I-beam which serves as a lock. The floats after being disconnected from the screw jacks are carried in clips or pockets on the outer side of the outriggers. The outriggers, when in firing position, support platforms which are swung to the vertical in traveling and are securely held in this position by cross ties which are fitted with connections for the cradle to lock it and prevent damage to the training mechanism.

To these and other ends the invention consists in the construction, arrangement, and combination of elements described hereinafter and pointed out in the claims forming a part of this specification.

A practical embodiment of the invention is illustrated in the accompanying drawings, wherein:

Fig. 1 is a view in side elevation of a vehicle mount constructed in accordance with the invention and shown in the traveling position;

Fig. 2 is a plan view of the mount in the firing position;

Fig. 3 is a view in front elevation of the mount in firing position with one wheel removed;

Fig. 4 is a detail side view of one of the outriggers;

Fig. 5 is a detail plan view thereof;

Fig. 6 is a detail end view showing the traveling lock;

Fig. 7 is a fragmentary view in elevation of a screw jack and float; and

Fig. 8 is a fragmentary plan view of Fig. 7.

Referring to the drawings by numerals of reference:

In carrying out the invention, a gun 4 is mounted on a pedestal 5, secured to the deck of a vehicle 6 which may be either an automobile trailer or railway carriage.

Hinged as at 7 to the front and rear of the side frames 8 of the vehicle are four outriggers 9, each bearing in its free end a heavy, vertically disposed screw jack 10 whose lower end is formed into a ball head 11 adapted to be received in semi-circular socket clamps 12 on larger circular floats 13. The float for each outrigger when detached is carried in a clip or pockets 14 on the outer side of each outrigger. The outriggers are of a proper length so that when folded in against the side frame for traveling their adjacent ends will be spaced sufficiently to receive the web of an I-beam lock 15 receivable in a bracket 15' secured to the side frame 8 and chained to the under side of the platform 16.

These platforms, one for each side of the vehicle, are hinged to the side frames 8 so that when traveling they may be raised to a vertical position. They are reinforced near their outer edge with a heavy channel bar 17 whose ends are apertured to receive studs 18 on the outriggers. When in the firing position the floats 13 are equidistant from the center of the pedestal 5, the opposite front and rear floats being in line with the center.

For the purpose of securely holding the platforms in the traveling position there are provided beams or cross ties 19 bridging both platforms and tied to the vehicle by turn buckles. The cross ties are fitted with connections 20 which may be slipped over projecting hooks 21 on the cradle of the gun 4 to serve as a traveling lock therefor to relieve the training and elevating mechanism of road stresses.

When it is desired to change from the traveling to the firing position, the traveling locks 15 and 19—20 are disconnected, the outriggers are opened outwardly, the floats adjusted, and the platform lowered. The outrigger jacks are then operated until the springs of the vehicle rise sufficiently to insure relief from the firing stresses.

While in the foregoing there has been illustrated and described such combination and arrangement of elements as constitute the preferred embodiment of my invention, it is nevertheless desired to emphasize the fact that interpretation of the invention should only be conclusive when made in the light of the subjoined claims.

I claim:

1. A vehicle, a gun mounted thereon, outriggers hinged to the vehicle and adapted to be folded in against the sides thereof, an I-beam insertible between adjacent ends of each pair of outriggers when folded for locking them in place, a screw jack mounted in the free end of each outrigger, a float on which the jack rests, means for clamping the float and jack, pockets on the outriggers for carrying the floats when detached, a platform hinged to each side of the vehicle, a channel bar secured to the under side thereof, studs on the outriggers adapted to be inserted in apertures in said bar, and cross ties for holding the platforms in the upright position for traveling, said ties formed with means for engaging the gun cradle.

2. A vehicle, a gun mounted thereon, outriggers hinged to the vehicle and adapted to be folded in against the sides thereof, an I-beam insertible between adjacent ends of each pair of outriggers when folded for locking them in place, a screw jack mounted in the free end of each outrigger, a float on which the jack rests, means for clamping the float and jack, pockets on the outriggers for carrying the floats when detached, a platform hinged to each side of the vehicle, a channel bar secured to the under side thereof, studs on the outriggers adapted to be inserted in apertures in said bar, and means for securing the platforms in the upright traveling position.

3. A vehicle, a gun mounted thereon, outriggers hinged to the vehicle and adapted to be folded in against the sides thereof, an I-beam insertible between adjacent ends of each pair of outriggers when folded for locking them in place, a screw jack mounted in the free end of each outrigger, a float on which the jack rests, means for clamping the float and jack, pockets on the outriggers for carrying the floats when detached, a platform hinged to each side of the vehicle, a channel bar secured to the under side thereof, and studs on the outriggers adapted to be inserted in apertures in said bar.

4. A vehicle, a gun mounted thereon, outriggers hinged to the vehicle and adapted to be folded in against the sides thereof, means for locking each pair of outriggers in folded position, a screw jack mounted in the free end of each outrigger, a float on which the jack rests, means for clamping the float and jack, a platform hinged to each side of the vehicle and adapted when lowered to rest on the outriggers, and means for securing the platforms in the upright position.

5. A vehicle, a gun mounted thereon, outriggers hinged to the vehicle and adapted to be folded in against the sides thereof, means for locking each pair of outriggers in folded position, a screw jack mounted in the free end of each outrigger, a float on which the jack rests, means for clamping the float and jack, and a platform hinged to each side of the vehicle and adapted when lowered to rest on the outriggers.

6. A vehicle, a gun mounted thereon, outriggers hinged to the vehicle and adapted to be folded thereagainst, means for locking each pair of outriggers in folded position, a screw jack mounted in the free end of each outrigger, a float on which the jack rests, and means for detachably clamping the float and jack.

7. A vehicle, a gun mounted thereon, outriggers hinged to the vehicle and adapted to be folded thereagainst, means for locking the outriggers in folded position, a screw jack mounted in the free end of each outrigger, a float on which the jack rests, and means for clamping the float and jack.

8. A vehicle, a gun mounted thereon, outriggers hinged to the vehicle, means for locking the outriggers when folded, a screw jack mounted in the free end of each outrigger, and a float on which the jack rests.

9. A vehicle, a gun mounted thereon, a platform hinged to each side of the vehicle, cross ties for holding the platforms in the upright position for traveling, a connection between the cross ties and gun cradle, and means for preventing displacement of the cross ties.

10. A vehicle, a gun mounted thereon, a platform hinged to each side of the vehicle, cross ties for holding the platforms in the upright position for traveling, and a connection between the cross ties and gun cradle.

THOS. A. CONLON.